United States Patent
Yen

(10) Patent No.: US 7,527,233 B2
(45) Date of Patent: May 5, 2009

(54) ADJUSTABLE APPARATUS FOR ADJUSTING POSITIONS OF DISPLAY AND ADJUSTING METHOD THEREOF

(75) Inventor: Ching-Hui Yen, Kaohsiung (TW)

(73) Assignee: Qisda Corporation, Taoyuan County (TW)

( * ) Notice: Subject to any disclaimer, the term of this patent is extended or adjusted under 35 U.S.C. 154(b) by 254 days.

(21) Appl. No.: 11/339,788

(22) Filed: Jan. 26, 2006

(65) Prior Publication Data

US 2006/0192065 A1   Aug. 31, 2006

(30) Foreign Application Priority Data

Feb. 1, 2005   (TW) ............... 94103131 A

(51) Int. Cl.
*A47G 29/00*   (2006.01)
(52) U.S. Cl. .............. 248/371; 248/393; 248/394; 248/395; 361/681
(58) Field of Classification Search ........... 248/371, 248/393, 394, 396, 397, 346.06, 404, 407, 248/650, 656, 288.11, 274.1, 133, 136, 188.2, 248/185, 429, 158, 917, 919, 920, 922, 923; 361/681, 825; 254/98, 102
See application file for complete search history.

(56) References Cited

U.S. PATENT DOCUMENTS

| | | | | |
|---|---|---|---|---|
| 3,586,271 A | * | 6/1971 | Sloyan | 248/652 |
| 4,527,766 A | * | 7/1985 | Krenz | 248/371 |
| 5,622,348 A | * | 4/1997 | Stechly | 248/371 |
| 5,833,183 A | * | 11/1998 | Chang | 248/176.1 |
| 5,915,658 A | * | 6/1999 | Sheng | 248/346.06 |
| 6,604,722 B1 | * | 8/2003 | Tan | 248/276.1 |
| 6,655,645 B1 | * | 12/2003 | Lu et al. | 248/176.1 |

* cited by examiner

*Primary Examiner*—J. Allen Shriver
*Assistant Examiner*—Todd M. Epps

(57) ABSTRACT

An adjustable apparatus for adjusting the positions of a display is provided. The display includes a base, a supporting arm and a display unit. Two ends of the supporting arm are pivotably connected to the base and the unit. The adjustable apparatus at least comprises a leading rod disposed within the base and an operation block mounted on the leading rod. One end of the leading rod is connected to the supporting arm. There are an outer thread formed on the surface of the leading rod and an inner thread correspondingly formed within the operation block. When the operation block is operated, the inner thread of the operation block is engaged with the outer thread of the leading rod, and the leading rod can be moved forwards or backwards so as to drive the supporting arm to rotate and adjust the positions of the display unit.

18 Claims, 3 Drawing Sheets

ADJUSTABLE APPARATUS FOR ADJUSTING POSITIONS OF DISPLAY AND ADJUSTING METHOD THEREOF

This application claims the benefit of Taiwan application Serial No. 094103131, filed Feb. 1, 2005, the subject matter of which is incorporated herein by reference.

BACKGROUND OF THE INVENTION

1. Field of the Invention

The invention relates in general to an adjustable apparatus capable of adjusting positions of display and adjusting method thereof, and more particularly to a low-cost and long-useful life adjustable apparatus and adjusting method thereof.

2. Description of the Related Art

Current desktop display, considering the ergonomics, the package size during the storage and delivery, and the body of the user, is designed to be not only adjustable for satisfying the needs of the user but also foldable to reduce the package size.

The desktop display mainly includes a base, a supporting arm and a display unit such as an LCD display unit. The supporting arm, flexibly connecting the base and the display unit, is capable of adjusting the positions of the display unit. Referring to FIG. 1, a diagram of a conventional position-adjustable display is shown. The display 10 uses two-stage supporting arms 14 and 15 to connect the base 12 and the display unit 16. The display unit 16 uses a frame 17 to support an LCD display panel 18, and the position of the display unit 16 is determined according to the supporting arm 15. The supporting arm 15 can be moved upwards and downwards as shown in the arrow of FIG. 1 to adjust the positions of the display unit 16 in accordance with the user's needs. A hinge apparatus 19 can be disposed to pivotably connect the supporting arm 14 and the base 12. Besides, a rotating mechanism (not shown in the diagram) can be further disposed between the display unit 16 and the supporting arm 15, so that the display unit 16 can have various angles of elevation or depression to provide different viewing angles. When the display 10 needs to be more compacted, the supporting arm 15 is moved along the supporting arm 14 downwards to the lowest point.

Referring to FIG. 2, another diagram of a conventional position-adjustable display is shown. In the display 20 of FIG. 2, a supporting arm 23 is used to connect the base 22 and the display unit 26, and the display unit 26 is mounted on the monitor linking unit 24. The first hinge apparatus 27 enables the supporting arm 23 to rotate with respect to the base 22, and the second rotating mechanism 28 positioned at the upper end of the supporting arm 23 is pivotably connected to the monitor linking unit 24. When the user needs to adjust the positions of the display unit 26, the display unit 26 is moved along the direction of the arrow via the pivoting of the first hinge apparatus 27. The angle of elevation or depression of the display unit 26 is changed via rotation of the second rotating mechanism 28. When the display 20 is to be compacted or stored, the supporting arm 23 is moved forwards to the lowest point, and the compacted condition is depicted by the dashed lines of FIG. 2.

All of the display disclosed above use the hinge apparatus as the pivoting components. Particularly, the hinge apparatus connecting the supporting arm and the base drives the display unit (i.e. monitor) to rotate forward or backward, so as to adjust the relative positions between the display unit and the user or achieve the compacted and storage position.

However, the mechanical parts used in the conventional hinge apparatus, such as the springs, the nuts, the screws and the elastic pads, possess limited useful life. Thus, the display unit would suffer from mechanical aging after a long period of service due to mechanical friction. Furthermore, the weight of the display unit also adds a heavy loading to the hinge apparatus. Therefore, the displays using hinge apparatus normally have the problem of functional deterioration. Typically, after 10,000 times of rotation, the hinge apparatus would decay by 15%. Besides, the hinge apparatus adds up the production cost of the display.

SUMMARY OF THE INVENTION

It is therefore the object of the invention to provide an adjustable apparatus capable of adjusting positions of display apparatus and adjusting method thereof. According to the incorporation of a leading rod and a rotatable operation block, the display can be adjusted to achieve a user-desired position or folded up for storage.

According to an object of the invention, an adjustable apparatus for adjusting the positions of a display apparatus is provided. The display apparatus has a base, a supporting arm and a display. Two ends of the supporting arm are pivotably connected to the base and the display, respectively. The adjustable apparatus at least includes a leading rod disposed within the base and an operation block mounted on the leading rod. One end of the leading rod is connected to the supporting arm. There are an outer thread formed on the surface of the leading rod and an inner thread correspondingly formed within the operation block. When the operation block is rotated, the inner thread of the operation block is movably engaged with the outer thread of the leading rod, so as to drive the leading rod to move forwards or backwards, and the supporting arm is rotated and the positions of the display or the display folded to a storage position can be adjusted or reached consequently.

According to the object of the invention, a display apparatus including a base, a display, a supporting arm and an adjustable apparatus is provided. Two ends of the supporting arm are pivotably connected to the base and the display, respectively. The adjustable apparatus is used for adjusting the positions of the display. The adjustable apparatus at least includes a leading rod disposed within the base and an operation block mounted on the leading rod. One end of the leading rod is connected to the supporting arm. There are an outer thread formed on the surface of the leading rod and an inner thread correspondingly formed within the operation block. When the operation block is rotated, the inner thread of the operation block is movably engaged with the outer thread of the leading rod, so as to drive the leading rod to move forwards or backwards, and the supporting arm is rotated and the positions of the display or the display folded to a storage position can be adjusted or reached consequently.

According to the object of the invention, a method for adjusting the positions of a display is provided. The display is pivotally connected to a base via a supporting arm to form a display apparatus. The adjusting method comprises:

rotating an operation block mounted on one end of a leading rod, wherein the operation block has an inner thread correspondingly engaged with an outer thread of the leading rod, the leading rod is disposed within the base, and another end of the leading rod is pivotally connected to the supporting arm.

When the operation block mounted on the leading rod is positioned at a first position, a minimum angle contained between the supporting arm and the leading rod is formed, and the display is positioned at a storage position.

When the operation block mounted on the leading rod rotates towards a second position, the leading rod drives the supporting arm to move away from the base.

When the operation block mounted on the leading rod is rotated to reach the second position, a maximum angle contained between the supporting arm and the leading rod is formed, and the supporting arm reaches a highest position.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides an adjusting apparatus, which replaces the conventional hinge apparatus to adjust the positions of the display apparatus by converting the movement on the thread of a screw to the movement on a straight line. The adjustment includes adjusting the display to various viewing positions and a storage position.

Figure 1:
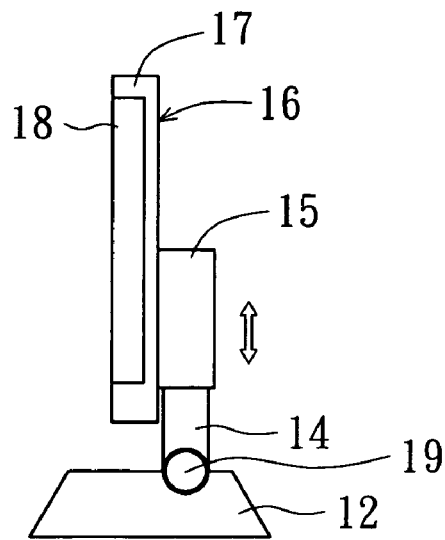
FIG. 1 (prior art) schematically shows a conventional position-adjustable display apparatus.
Figure 2:
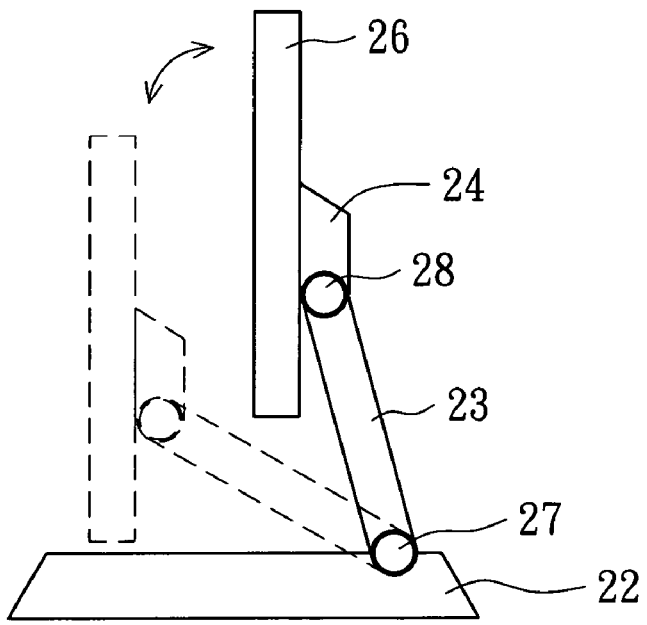
FIG. 2 (prior art) schematically shows another conventional position-adjustable display apparatus.
Figure 3A:
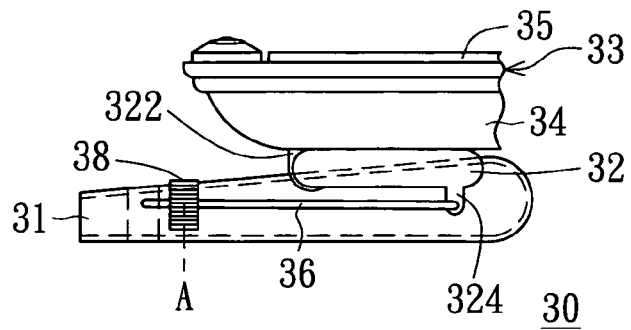
FIG. 3A~FIG. 3C illustrate an adjusting apparatus according to a preferred embodiment of the invention, showing the display respectively positioned at a storage position, a lower position, and a highest position.
Figure 3B:
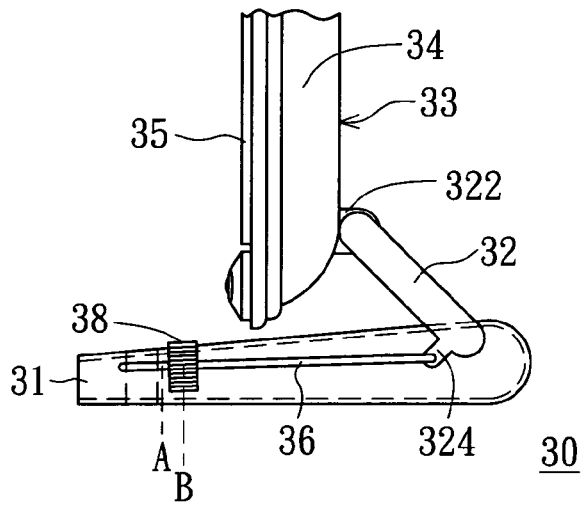
Figure 3C:
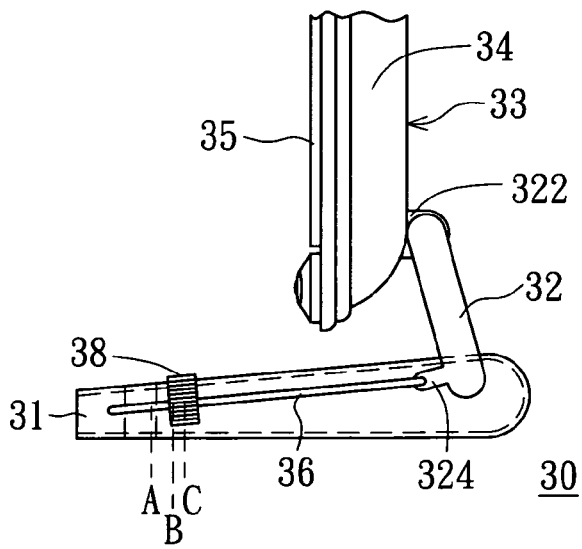

FIG. 3A~3C illustrate an adjusting apparatus according to a preferred embodiment of the invention. The display apparatus 30 mainly includes a base 31, a supporting arm 32 and a display 33. The display 33 includes a frame 34 and an LCD display panel 35. Two ends of the supporting arm 32 are pivotably connected to the display 33 and the base 31 via a first connecting portion 322 and a second connecting portion 324, respectively. The first connecting portion 322 can control the angle between the display 33 and the supporting arm 32. The second connecting portion 324 is pivotally connected to the adjusting apparatus of the invention.

The adjusting apparatus according to the embodiment of the present invention at least includes a leading rod 36 and an operation block 38. The leading rod 36 is disposed within the base 31. The operation block 38 is disposed within an accommodation space of the base 31, and part of the operation block 38 is preferably exposed outside the base 31 to facilitate the user performing the rotation of the operation block 38.

An outer thread (not shown in the diagrams) is formed on the surface of the leading rod 36. The operation block 3 has a hollow hole, and the inner surface of the hole has an inner thread correspondingly engaged to the outer thread of the leading rod 36. When the operation block 38 is rotated, the leading rod 36 can be moved forward or backward, depending on the clockwise or counterclockwise rotation being performed. One end of the leading rod 36 is pivotably connected to the second connecting portion 324 of the supporting arm 32. Therefore, when the leading rod 36 is moved, the second connecting portion 324 and the supporting arm 32 are sequentially driven so as to achieve the object of position adjustment of the display 33.

FIG. 3A shows the display 33 setting at a storage position. The display 33 of FIG. 3A is substantially parallel to the supporting arm 32 (via the function of the first connecting portion 322), and the operation block 38 is mounted on the leading rod 36 at the position A. In the present embodiment, when the display 33 is positioned at the storage position, the angle contained between the leading rod 36 and the supporting arm 32 is substantially 0°.

When the operation block 38 is rotated, the leading rod 36 is driven and moved away from the supporting arm 32, and the second connecting portion 324 is consequently driven. Since the second connecting portion 324 is formed at one end of the supporting arm 32, the supporting arm 32 is rotated and lifted away from the base 31 while the second connecting portion is driven (such as drawn) by the moving leading rod 36, as shown in FIG. 3B. Meanwhile, the operation block 38 mounted on the leading rod 36 is rotated to reach the position B, and the display 33 is positioned at a lower position.

When the operation block 38 mounted on the leading rod 36 is rotated to reach the position C, a maximum angle contained between the supporting arm 32 and the leading rod 36 is presented, as shown in FIG. 3C. Meanwhile, the display 33 is positioned at a highest position.

Besides, in the present embodiment, the operation block 38 is mounted on and vertical to the leading rod 36. When the operation block 38 is rotated to drive the leading rod 36 moving backwards (i.e. in the direction away from the supporting arm 32) or moving forwards (i.e. in the direction towards the supporting arm 32), the position change of the second connecting portion 324 will drive one end of the leading rod 36 to raise or fall, so as to make the operation block 38 tilt from the base 31. As shown in FIG. 3A~FIG. 3C, the operation block 38 tilts gradually. The design of the space for receiving the operation block 38 (such as the accommodation space 381 of FIG. 4) is not subjected to any specific restriction. Any design permitting enough space for the operation block 38 to tilt would do.

Figure 4:
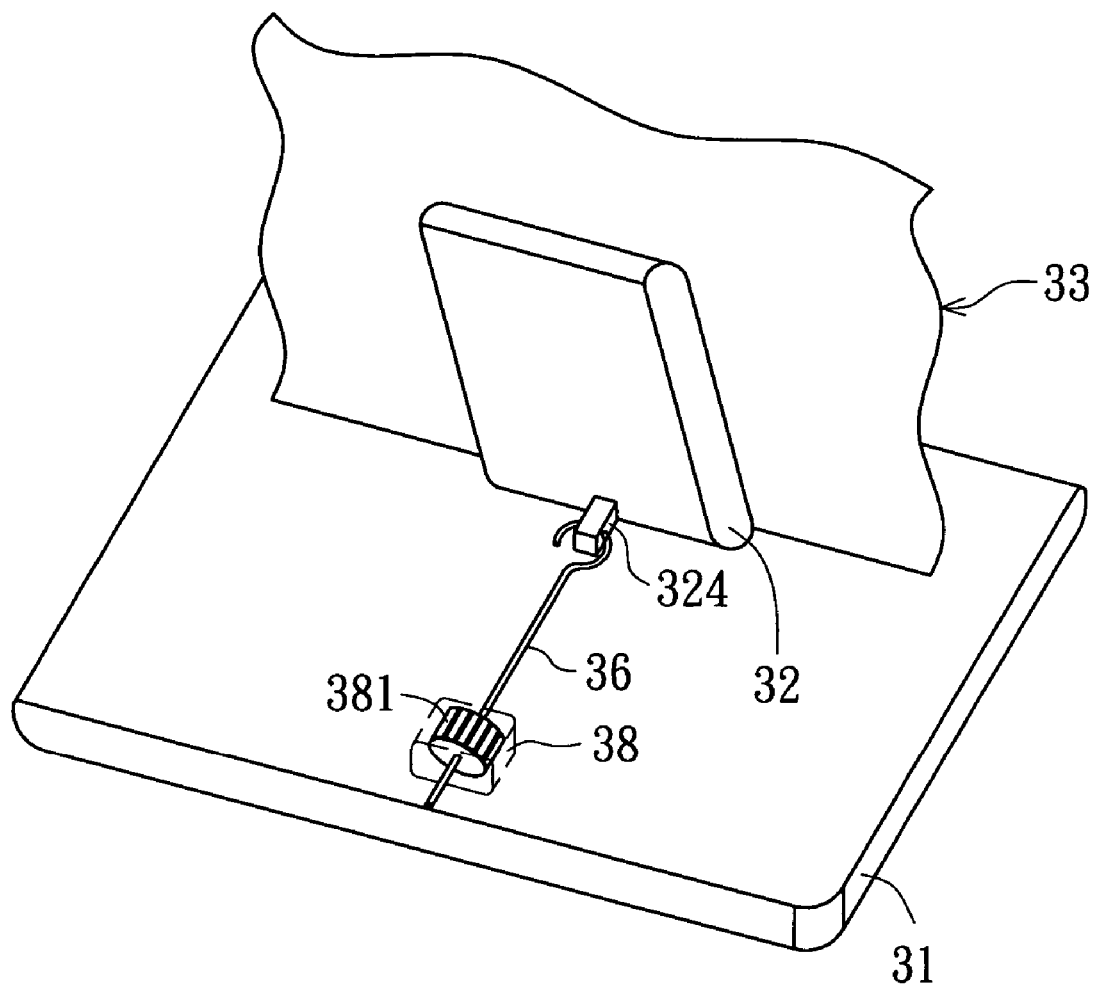
FIG. 4 is a diagram showing a connection between a second connecting portion and a leading rod according to a preferred embodiment of the invention.

FIG. 4 is a diagram showing a connection between a second connecting portion and a leading rod according to a preferred embodiment of the invention. In FIG. 4, one end of the leading rod 36 is designed as a hook-shaped portion and flexibly hooked at the second connecting portion 324, so that the relative position of various angles can be formed between the leading rod 36 and the second connecting portion 324. However, anyone who is skilled in the technology will understand that the connection methods between the leading rod 36 and the second connecting portion 324 includes a variety of designs, and not necessarily limited to the illustration shown in FIG. 4. No matter which design is adapted, the leading rod 36 moved due to the rotation of the operation block 38 can simultaneously drive (such as draw) the second connecting portion 324 at one end of the supporting arm 32, so as to cause the rotation of the supporting arm 32 and vary the position of the display 33.

According to the aforementioned disclosure, compared with the conventional hinge apparatus, the adjustable apparatus of the invention has the advantages of easy assembly, lower material cost, and is free of functional deterioration of relevant components. After a long period of operation, the display of the invention is still capable of being stably positioned at any position desired by the user or at the storage position for the convenience of delivery.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adjustable apparatus for adjusting the positions of a display apparatus, wherein the display apparatus has a base, a supporting arm and a display, two ends of the supporting arm being pivotally connected to the base and the display respectively, and the adjustable apparatus comprising:
a leading rod, disposed within the base and having an outer thread formed on a surface of the leading rod, and one end of the leading rod being pivotably connected to the supporting arm; and
an operation block, mounted on the leading rod and having an inner thread, and the inner thread being movably engaged to the outer thread of the leading rod;
wherein when the operation block is rotated, the inner thread of the operation block is movably engaged with the outer thread of the leading rod, so as to drive the leading rod to move forwards or backwards, and the supporting arm is rotated and the position of the display is adjusted consequently.

2. The adjustable apparatus according to claim 1, wherein the operation block is received in an accommodation space of the base.

3. The adjustable apparatus according to claim 1, wherein part of the operation block is exposed outside the base for the user to rotate the operation block.

4. The adjustable apparatus according to claim 1, wherein when the operation block mounted on the leading rod is rotated to reach a first position, the supporting arm is substantially parallel to the leading rod.

5. The adjustable apparatus according to claim 4, wherein when the operation block mounted on the leading rod is rotated to reach the first position, the leading rod is substantially parallel to the display apparatus.

6. The adjustable apparatus according to claim 1, wherein when the operation block mounted on the leading rod is rotated to reach a second position, the supporting arm reaches a highest position.

7. The adjustable apparatus according to claim 1, wherein when the operation block mounted on the leading rod is rotated to reach a second position, the supporting arm is perpendicular to the leading rod.

8. The adjustable apparatus according to claim 1, wherein one end of the leading rod pivotably connected to the supporting arm via the second connecting portion; the leading rod moved due to the rotation of the operation block simultaneously drives the second connecting portion so as to cause the rotation of the supporting arm.

9. A display apparatus, comprising:
a base;
a display;
a supporting arm pivotally connected to the base and the display respectively; and
an adjustable apparatus for adjusting the positions of the display, comprising:
a leading rod, disposed within the base and having an outer thread formed on a surface of the leading rod, and one end of the leading rod being pivotably connected to the supporting arm; and
an operation block, mounted on the leading rod and having an inner thread, and the inner thread being movably engaged to the outer thread of the leading rod;
wherein when the operation block is rotated, the inner thread of the operation block is movably engaged with the outer thread of the leading rod, so as to drive the leading rod to move forwards or backwards, and the supporting arm is rotated and the position of the display is adjusted consequently.

10. The display apparatus according to claim 9, wherein the base has an accommodation space for receiving the operation block.

11. The display apparatus according to claim 9, wherein part of the operation block is exposed outside the base for the user to rotate the operation block.

12. The display apparatus according to claim 9, wherein when the operation block mounted on the leading rod is rotated to reach a first position, the supporting arm is substantially parallel to the leading rod.

13. The display apparatus according to claim 12, wherein the display is substantially parallel to the base when the operation block is rotated to reach the first position.

14. The display apparatus according to claim 9, wherein when the operation block mounted on the leading rod is rotated to reach a second position, the supporting arm reaches a highest position.

15. The display apparatus according to claim 9, wherein when the operation block mounted on the leading rod is rotated to a second position, the supporting arm is perpendicular to the leading rod.

16. The display apparatus according to claim 15, wherein the display is substantially perpendicular to the base.

17. The display apparatus according to claim 9, wherein two ends of the supporting arm are pivotably connected to the display and the base via a first connecting portion and a second connecting portion, respectively.

18. The display apparatus according to claim 17, wherein one end of the leading rod pivotably connected to the supporting arm via the second connecting portion; the leading rod moved due to the rotation of the operation block simultaneously drives the second connecting portion so as to cause the rotation of the supporting arm.

* * * * *